United States Patent
Fraenk et al.

(10) Patent No.: US 12,494,693 B2
(45) Date of Patent: Dec. 9, 2025

(54) SEALING ASSEMBLY ON A HOUSING OF AN ELECTRIC DRIVE MOTOR

(71) Applicant: Bayerische Motoren Werke Aktiengesellschaft, Munich (DE)

(72) Inventors: Manfred Fraenk, Munich (DE); Maximilian Stoeger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 18/562,936

(22) PCT Filed: Jun. 29, 2022

(86) PCT No.: PCT/EP2022/067818
§ 371 (c)(1),
(2) Date: Nov. 21, 2023

(87) PCT Pub. No.: WO2023/006321
PCT Pub. Date: Feb. 2, 2023

(65) Prior Publication Data
US 2024/0372428 A1    Nov. 7, 2024

(30) Foreign Application Priority Data
Jul. 27, 2021    (DE) ...................... 10 2021 119 401.6

(51) Int. Cl.
*H02K 3/50*    (2006.01)
*F16J 15/52*    (2006.01)
*H02K 5/22*    (2006.01)

(52) U.S. Cl.
CPC .............. *H02K 5/225* (2013.01); *F16J 15/52* (2013.01); *H02K 3/50* (2013.01); *H02K 2203/06* (2013.01)

(58) Field of Classification Search
CPC ............ F16J 15/52; H02K 3/50; H02K 5/225; H02K 9/19; H02K 2203/06; H02K 5/10; H02K 5/00; H02K 5/22
(Continued)

(56) References Cited

U.S. PATENT DOCUMENTS 6,655,989 B1    12/2003    Gale et al.
9,318,817 B2    4/2016    Hildebrand et al.
(Continued)

FOREIGN PATENT DOCUMENTS

CN    205583910 U    9/2016
CN    207926338 U    9/2018
(Continued)

OTHER PUBLICATIONS

Korean-language Office Action issued in Korean Application No. 10-2023-7035382 dated Nov. 15, 2024 with English translation (8 pages).
(Continued)

*Primary Examiner* — Alexander A Singh
(74) *Attorney, Agent, or Firm* — Crowell & Moring LLP

(57) ABSTRACT

A sealing assembly on a housing of an electric drive motor for both sealing a housing opening and supporting a line element which is designed for transmitting electrical power and has at least one electrical conductor. The sealing assembly has a support bellows made of a resilient material and having a recess for the passage of the line element or having one recess for the passage of each electrical conductor of the line element. The support bellows has outer fastening recesses for oil-tight fastening, in particular for a screw connection, of the support bellows to the housing, in particular via an outer ring. The support bellows may also have inner fastening recesses for connection of the support bellows to the line element. For this purpose, the line element
(Continued)

has a mounting surface for its connection to the support bellows. A stabilizing inner ring may be provided, which has the same recesses for the passage of the line element or the electrical conductors and the same inner fastening recesses as the support bellows, the inner fastening recesses being provided for the connection of the inner ring to the support bellows and the line element.

5 Claims, 6 Drawing Sheets

(58) Field of Classification Search
USPC .................................................. 310/89, 71
See application file for complete search history.

(56) References Cited

U.S. PATENT DOCUMENTS

| 2007/0207652 | A1 | 9/2007 | Tsuruta | |
|---|---|---|---|---|
| 2008/0138226 | A1* | 6/2008 | Koitabashi | H01R 13/5205 |
| | | | | 418/55.1 |
| 2008/0279703 | A1* | 11/2008 | Wang | F01C 1/10 |
| | | | | 417/422 |
| 2010/0000786 | A1* | 1/2010 | Yoshizawa | H02K 5/225 |
| | | | | 174/659 |

FOREIGN PATENT DOCUMENTS

| CN | 112688460 A | 4/2021 |
|---|---|---|
| DE | 103 31 416 A1 | 1/2004 |
| DE | 10 2019 132 599 A1 | 6/2021 |
| JP | 2004-15977 A | 1/2004 |

OTHER PUBLICATIONS

International Search Report (PCT/ISA/210) issued in PCT Application No. PCT/EP2022/067818 dated Oct. 27, 2022 with English translation (5 pages).

German-language Written Opinion (PCT/ISA/237) issued in PCT Application No. PCT/EP2022/067818 dated Oct. 27, 2022 with English translation (11 pages).

German-language Search Report issued in German Application No. 10 2021 119 401.6 dated Oct. 28, 2021 with partial English translation (9 pages).

* cited by examiner

SEALING ASSEMBLY ON A HOUSING OF AN ELECTRIC DRIVE MOTOR

BACKGROUND AND SUMMARY

The invention relates to a sealing assembly on a housing of a motor vehicle, in particular on an electric machine housing, into which at least one line element designed for transmitting electrical power leads in or out.

DE 10 2019 132 599 A1 discloses a holding assembly on an electric machine housing for an electrical line element. Here, the line element is also referred to, for example, as a cable or power cable. In particular, the line element is designed to transmit electrical power using or by means of electrical high voltage such that the line element is designed, for example, as a high-voltage line or as a high-voltage cable. An electrical high voltage is usually understood to mean an electrical voltage which preferably amounts to several hundred volts. This makes it possible to realize particularly large electrical powers for electrically driving hybrid vehicles or purely electric vehicles. In its completely manufactured state, the motor vehicle comprises, for example, at least one electric machine (electric drive motor) by means of which the motor vehicle can be electrically driven. The electric machine is also a high-voltage component whose electrical voltage, in particular electrical operating or nominal voltage, amounts to several hundred volts.

The line element is used, for example, to transmit the electrical power stored in a high-voltage accumulator to the electric machine for electromotively driving the vehicle. Furthermore, in a generator mode, the electric machine can also transmit electrical power to the high-voltage accumulator in the reverse direction via the line element.

The housing can in particular be the housing of a stator of an electric machine or of an electric drive motor. The line element has at least one electrical conductor for transmitting the electrical power.

Specifically, the holding assembly according to DE 10 2019 132 599 A1 comprises a connecting element which is formed separately from the line element and which is fastened to the line element, in particular to the sheath or, via the sheath, to the line element. The connecting element has a flange which is arranged on a first side of a wall of the housing. The flange is a flat element which projects, for example, from a basic body of the connecting element and which, for example, projects outwardly from the basic body in the radial direction of the conductor or can be formed in one piece with the basic body. The flange is fastened, in particular on the first side of the wall, to the housing or to the wall and thus to the housing, as a result of which the connecting element is fastened to the housing via the flange and the line element is fastened to the housing via the connecting element, in particular on the first side. The holding assembly additionally has a sealing element which is formed separately from the flange and which extends completely around a through-opening in the circumferential direction of the through-opening and preferably takes the form of an O-ring.

It is the object of the present invention to develop an assembly in a motor vehicle for the passage of an electrical line element into a housing or out of a housing with a view to particularly simple, stable and secure mounting.

This object is achieved according to the invention by a sealing assembly having the features of the independent claims. Advantageous embodiments of the invention form the subject matter of the dependent claims.

The invention relates to a sealing assembly on the housing of an electric drive motor both for sealing a housing aperture and for supporting a line element which is designed for transmitting electrical power and has at least one electrical conductor. The sealing assembly comprises a support bellows made of elastic material and having a cutout for the passage of the line element or having a respective cutout for the passage of each electrical conductor of the line element. Furthermore, the support bellows comprises outer fastening cutouts for an oiltight fastening, in particular for a screw connection, of the support bellows to the housing, in particular via an outer ring mounted on the housing.

Preferably, the support bellows also has inner fastening cutouts for a connection, in particular a screw connection, of the support bellows to the line element. For this purpose, the line element has a mounting surface for its (screw) connection to the support bellows.

There is preferably also provided a stabilizing inner ring which has the same cutouts for the passage of the line element or of the electrical conductors and the same inner fastening cutouts as the support bellows, wherein the inner fastening cutouts are provided for the (screw) connection of the inner ring to the support bellows and to the line element. This ensures that the cutouts for the passage of the line elements must not necessarily be tailored with a precise fit, but may be.

The invention is based on the following further considerations.

In the case of electric machines, the power supply lines (electric cables) already mentioned above have to be led in an oiltight manner through the machine housing, in particular through covers, housing walls or partition walls of the housing components.

Owing to the large component tolerance of the components involved, simple sealing by means of an O-ring according to the prior art is not advantageous, since the position of the leadthroughs is dependent on the assembly and/or manufacturing tolerances. These are usually in the range of several millimeters; however, for an O-ring seal, only a few tenths of a millimeter are permissible.

The basic principle of the invention is a cover at least as part of a sealing assembly in the form of a flexible (preferably elastic) element, in particular in the form of a "support bellows", which could also be referred to as an elastic sleeve or diaphragm which, on the one hand, provides sealing on the connector of the windings and, on the other hand, on the housing cover of the electric machine. Large tolerances of the components are thus possible, since the flexible element can compensate for them without having to fix or orient the components geometrically with respect to one another. This cover will be referred to below as a "support bellows" since, on the one hand, it seals flexibly like a folding bellows (preferably with only one fold) and at the same time serves as a holder for the electrical supply lines.

This invention is particularly advantageous for application in vehicles having dangerous contact voltages from 48 V, in particular above 400 V.

Further details of the invention will emerge from the following description of preferred exemplary embodiments with the associated drawings.

BRIEF DESCRIPTION OF THE DRAWINGS

In the figures, identical or functionally identical elements are provided with the same reference signs.

DETAILED DESCRIPTION OF THE DRAWINGS

Figure 1:
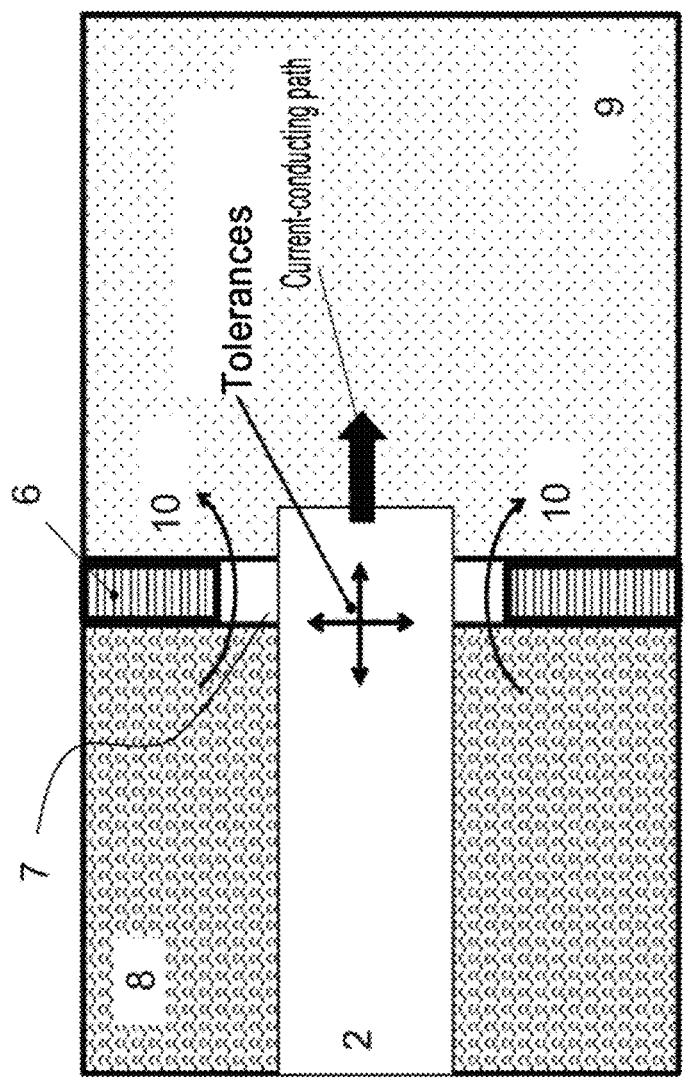
FIG. 1 is a schematic view showing the problem to be solved by the invention.

FIG. 1 is a schematic view showing the problem to be solved by the invention. A housing 6 of an electric drive motor 13 (see FIG. 4) has a housing aperture 7 through which a line element 2, at least in the form of an electrical line or preferably in the form of an element having a plurality of integrated electrical lines A, B and C (see also FIG. 2 and FIG. 3), is to be led from the oil space 8 of the housing 6 outwardly into an air space 9. Sealing paths 10, that is to say gaps to be closed in an oiltight manner, are situated between the line element 2 and the edge of the housing aperture 7.

Figure 2:
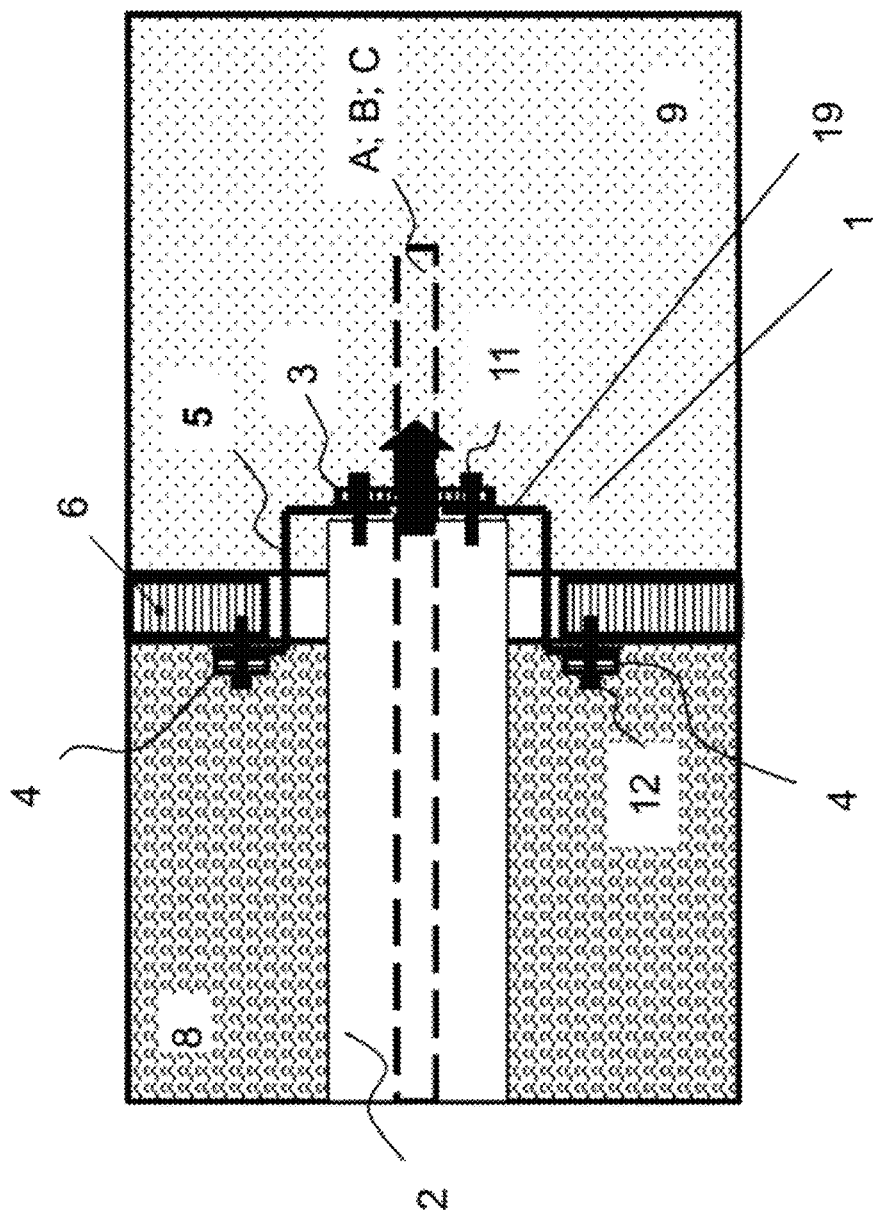
FIG. 2 is a schematic view showing the principle of the idea according to the invention in a first exemplary embodiment.

FIG. 2 is a schematic view showing a sealing assembly 1 according to an embodiment of the invention for solving the problem illustrated in FIG. 1 on the housing 6 both for sealing the housing aperture 7 and for supporting the line element 2 which is designed for transmitting electrical power and has here, for example, an element with at least one integrated electrical conductor A, B and/or C.

Figure 3:
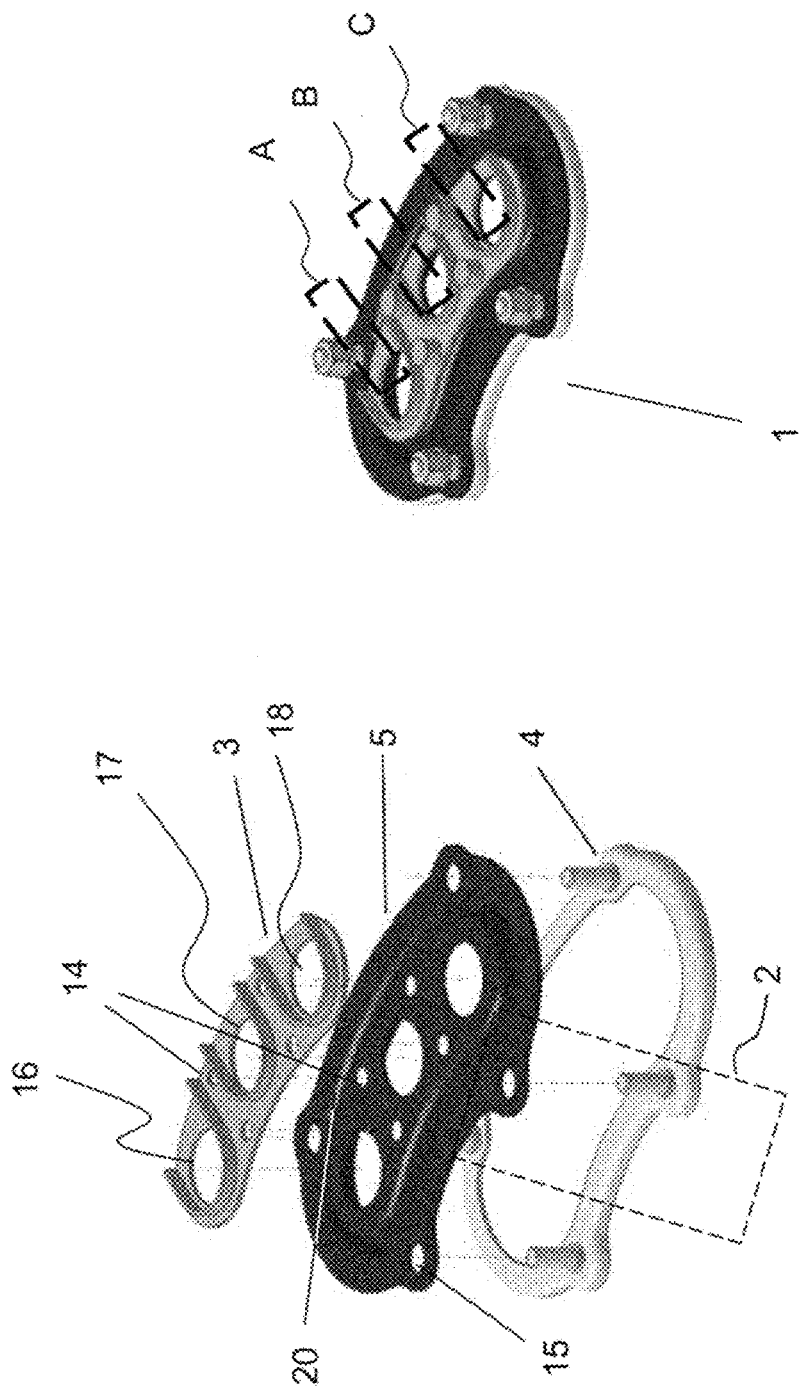
FIG. 3 is a perspective view showing a possible geometry of the sealing assembly according to the invention in a second exemplary embodiment both as an exploded drawing and in the mounted state.

The sealing assembly 1 comprises a support bellows 5 made of elastic material and having a cutout for the passage of the line element 2 or having a respective cutout 16, 17 and 18 (see also exemplary embodiment for a particularly advantageous component geometry according to FIG. 3) for the passage of each electrical conductor A, B and C of the line element 2. Moreover, the support bellows 5 comprises, in particular on the edge, outer fastening cutouts 15 (see also exemplary embodiment for a particularly advantageous component geometry according to FIG. 3) for a screw connection 12 of the support bellows 5 to the housing 6. For this purpose, the housing 6 preferably has, on the edge of the housing aperture 7, a stiffened folding frame 4, which is referred to here as an outer ring 4—in particular with respect to the preferably as central as possible line apertures or cutouts 16, 17 and 18.

In an advantageous development of the invention, the support bellows 5 also has inner fastening cutouts 14 (see also exemplary embodiment for a particularly advantageous component geometry according to FIG. 3) for a screw connection 11 of the support bellows 5 to the line element 2, for which purpose the line element 2 in turn has a mounting surface 19 for its screw connection 11 to the support bellows 5.

In a further advantageous embodiment of the sealing assembly 1 according to the invention, there is provided a stabilizing inner ring 3 which has the same cutouts 16, 17, 18 for the passage of the line element 2 or of the electrical conductors A, B and C and the same inner fastening cutouts 14 as the support bellows 5, wherein the inner fastening cutouts 14 are provided for the screw connection 11 of the inner ring 3 to the support bellows 5 and to the line element 2.

FIG. 3 shows a particularly advantageous exemplary embodiment on the right side in the mounted state.

Figure 4:
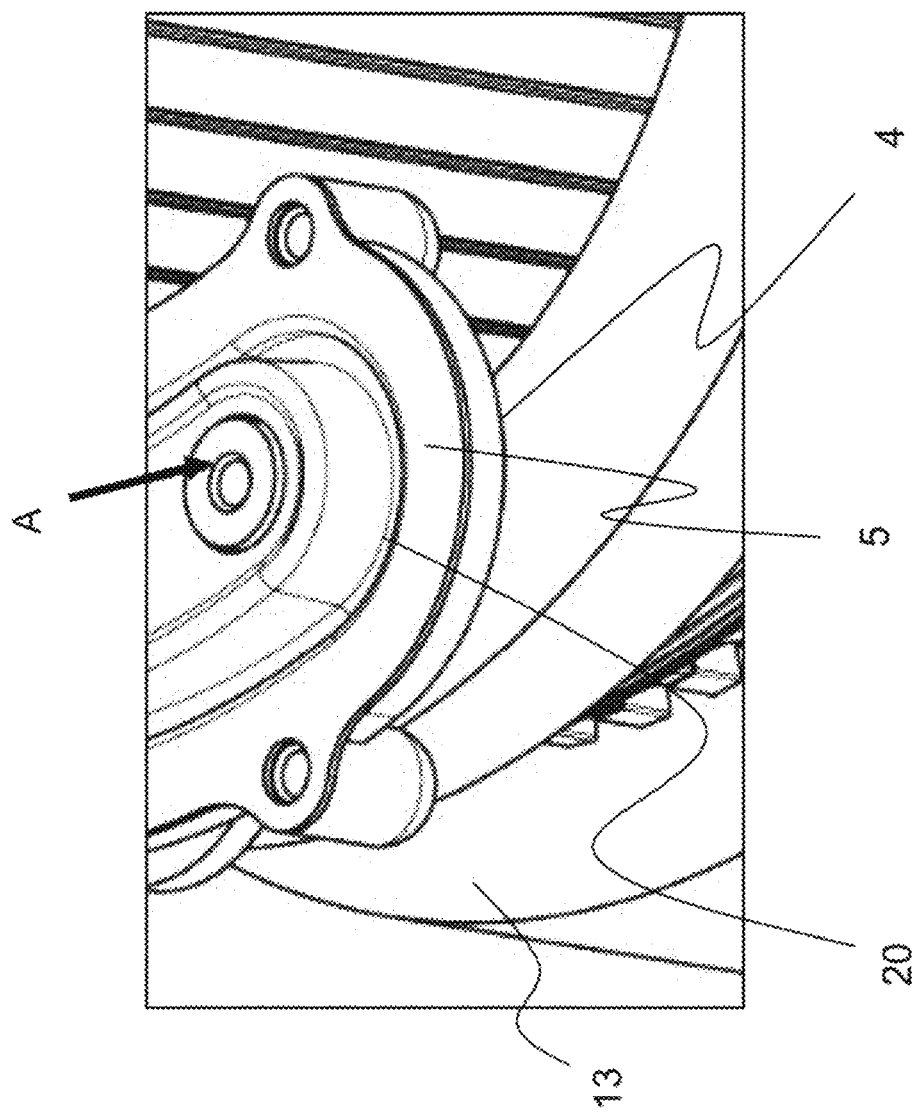
FIG. 4 is a perspective detail view of a possible geometry of the sealing assembly according to the invention in a third exemplary embodiment in the mounted state on the housing of an electric drive motor.
Figure 5:
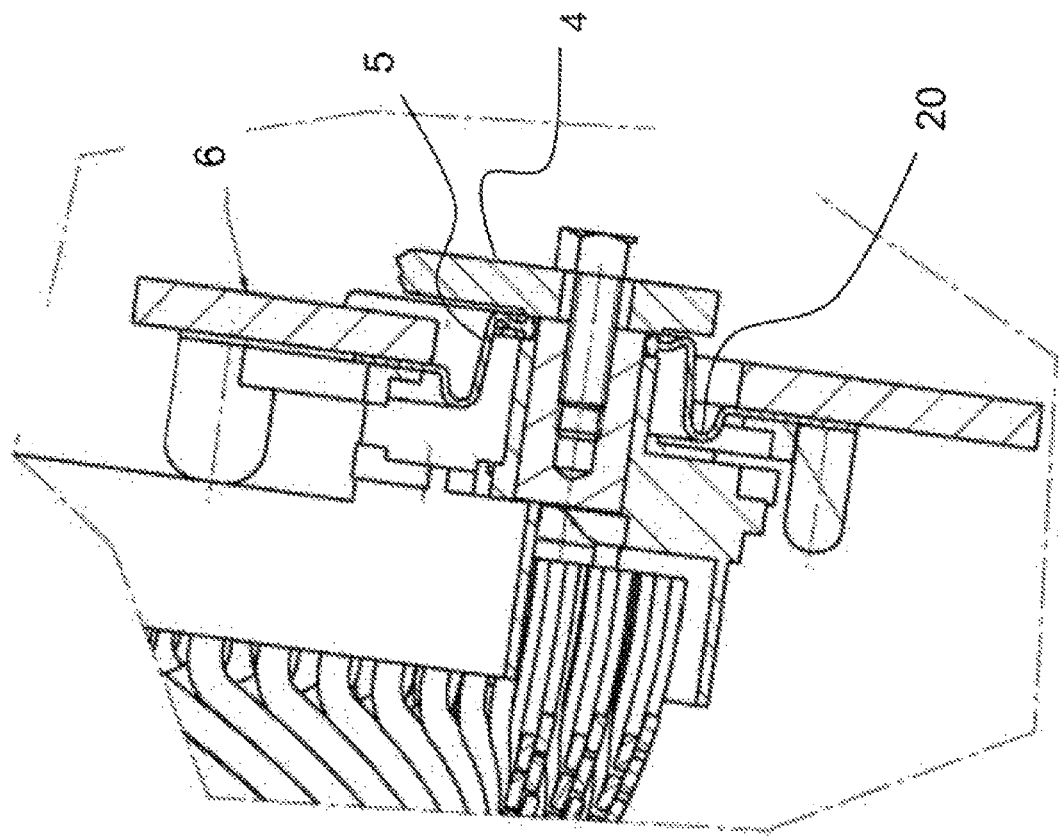
FIG. 5 shows a graphical sectional detail view of the sealing assembly in a fourth exemplary embodiment.

According to FIG. 3 (see shadow), FIG. 4 and FIG. 5, it is possible, in a particularly advantageous manner, for a peripheral groove ("twisted S shape") for forming a flexible fold 20 to be provided in the edge region of the support bellows 5 inside the outer fastening cutouts 15.

Figure 6:
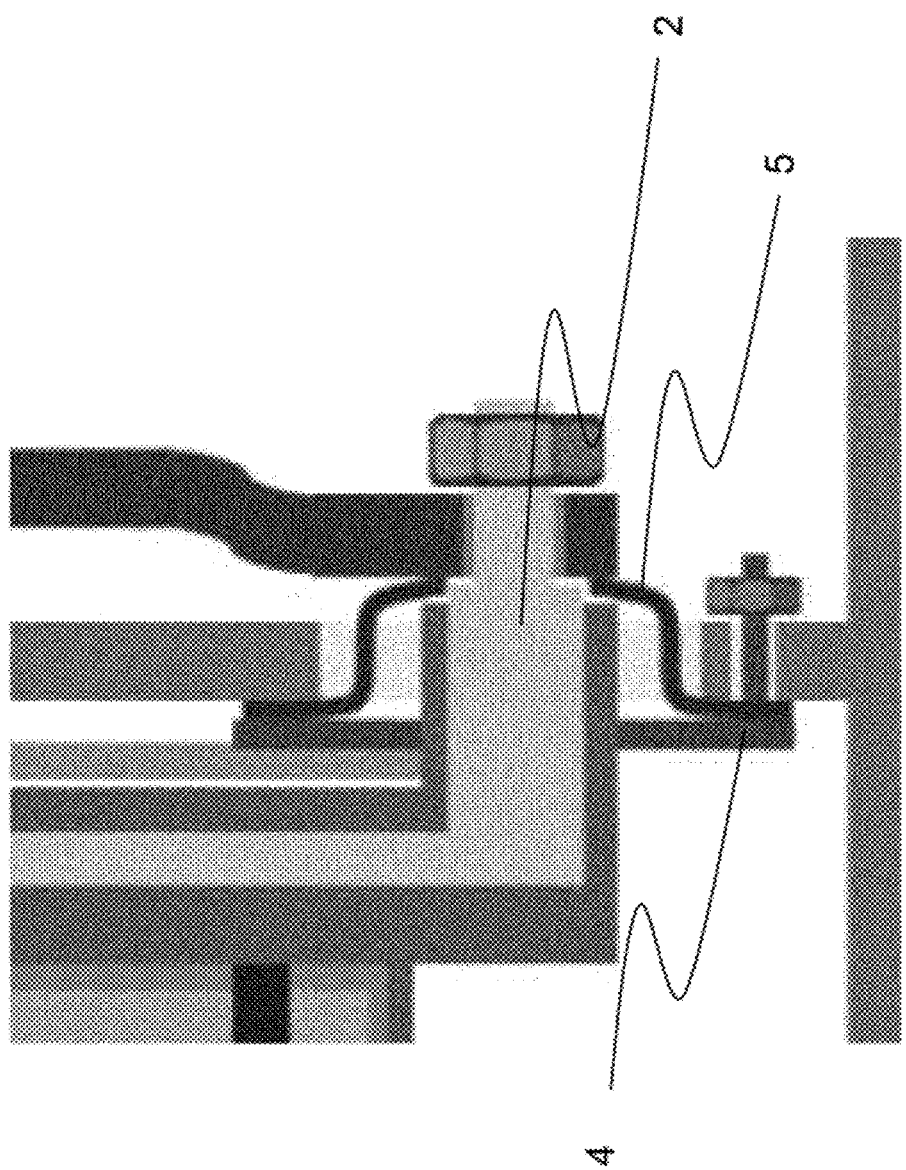
FIG. 6 shows a schematic sectional detail view of the sealing assembly in a fifth exemplary embodiment.

FIG. 5 and FIG. 6 schematically show a further simplified exemplary embodiment according to the invention without an inner ring 3. Although this possibly makes the holding device 1 less stable, it is easier to mount.

The invention claimed is:

1. A sealing assembly, comprising:
a housing of an electric drive motor having a housing aperture;
a line element which transmits electrical power and has at least one electrical conductor;
a support bellows made of elastic material and having a cutout for passage of the line element or having a respective cutout for passage of each electrical conductor of the line element, wherein
the sealing assembly is provided both for sealing the housing aperture and for supporting the line element, and
the support bellows comprises outer fastening cutouts for an oil-tight fastening of the support bellows to the housing,
wherein the support bellows has inner fastening cutouts for a connection of the support bellows to the line element, and the line element has a mounting surface by which the line element is connected to the support bellows; and
a stabilizing inner ring which has same cutouts for passage of the line element or of each electrical conductor and same inner fastening cutouts as the support bellows,
the inner fastening cutouts are provided for connecting the stabilizing inner ring to the support bellows and to the line element.

2. The sealing assembly according to claim 1, further comprising:
an outer ring on an edge of the housing aperture for fastening the support bellows to the housing via the outer fastening cutouts.

3. The sealing assembly according to claim 1, wherein the support bellows has, in an edge region, a peripheral groove forming a flexible fold.

4. A motor vehicle comprising a sealing assembly according to claim 1.

5. A sealing assembly comprising:
a housing of an electric drive motor having a housing aperture;
a line element which transmits electrical power and has at least one electrical conductor;
a support bellows made of elastic material and having a cutout for passage of the line element or having a respective cutout for passage of each electrical conductor of the line element, wherein
the sealing assembly is provided both for sealing the housing aperture and for supporting the line element, and the support bellows comprises outer fastening cutouts for an oil-tight fastening of the support bellows to the housing; and an outer ring on an edge of the housing aperture for fastening the support bellows to the housing via the outer fastening cutouts.

* * * * *